United States Patent [19]
Henson

[11] Patent Number: 5,016,570
[45] Date of Patent: May 21, 1991

[54] COLLAPSIBLE CARRYING CONTAINER FOR ANIMALS

[76] Inventor: J. Peter Henson, 9719 Folknoll, Stafford, Tex. 77477

[21] Appl. No.: 518,879

[22] Filed: May 4, 1990

[51] Int. Cl.⁵ .............................................. A01K 1/03
[52] U.S. Cl. ......................................... 119/19; 119/17
[58] Field of Search ............................... 119/17, 19, 15

[56] References Cited

U.S. PATENT DOCUMENTS

| | | |
|---|---|---|
| 785,794 | 3/1905 | Buckingham ........................ 119/19 |
| 1,198,524 | 9/1916 | Cunliffe .................................... 119/19 |
| 2,398,797 | 4/1946 | Meyer et al. ........................... 119/19 |
| 2,892,562 | 6/1959 | Smithson ................................ 119/17 |
| 3,048,147 | 8/1962 | McKean ................................. 119/19 |
| 3,195,506 | 7/1965 | Beard ....................................... 119/19 |
| 3,270,713 | 9/1966 | Rubricius ............................... 119/17 |
| 3,890,932 | 6/1975 | Sanzone et al. ........................ 119/19 |
| 4,109,427 | 8/1978 | O'Brian et al. ........................ 119/19 |
| 4,183,323 | 1/1980 | Maines .................................... 119/19 |
| 4,195,593 | 4/1980 | Dunn ....................................... 119/19 |
| 4,286,086 | 3/1981 | Sou .......................................... 119/19 |
| 4,397,398 | 8/1983 | Watanabe ............................... 119/19 |
| 4,484,540 | 11/1984 | Yamamoto ............................. 119/19 |
| 4,527,512 | 7/1985 | Sugiura ................................... 119/19 |
| 4,590,885 | 5/1986 | Sugiura ................................... 119/19 |
| 4,603,658 | 8/1986 | Garnsey ................................. 119/19 |

Primary Examiner—Paul J. Hirsch
Attorney, Agent, or Firm—James L. Jackson & Assoc.

[57] ABSTRACT

A collapsible carrying container for animals includes top, bottom and opposed side walls which are in hinged assembly by means of four elongate hinges that extend substantially the entire length of the container. The top, bottom and side walls are capable of forming a rectangular animal enclosure and are enabled by the hinges to collapse in the manner of a parallelogram to a substantially flat condition. Opposed end walls are hingedly connected to the bottom wall and include out-turned structural flanges on the top, bottom and sides thereof for enhancement of the structural integrity of the end portions of the animal carrier unit. The hinges are connected to the outer edges of the lower out-turned structural flanges, thus permitting the end walls to be positioned within the rectangular enclosure. Locks are provided at the end portions of the top wall and include hooks that engage about the superposed ends of the top wall and out-turned structural flanges to thereby lock the end walls in place. An internal structural member is secured to the inner surface of the top wall to provide enhanced structural integrity thereof and to define stops at each end thereof which position the end walls. A carrying handle assembly is also secured to the top wall to permit manual support of the unit.

8 Claims, 2 Drawing Sheets

COLLAPSIBLE CARRYING CONTAINER FOR ANIMALS

FIELD OF THE INVENTION

This invention relates generally to containers that are utilized for confining and protecting animals such as dogs and cats especially while the animals are being transported and for confining and protecting animals during the presence of the animals in a public place. More specifically, the present invention is related to a protective container for animals that is capable of being quickly and efficiently reduced to a relatively thin structure such as for storing the animal container when not in use.

BACKGROUND OF THE INVENTION

Animal containers have been widely used in the market for an extensive period of time for protecting animals especially during shipment and handling and for protecting the animals while in a public place. For the most part, such animal containers are not collapsible, and when not in use, constitute a problem from the standpoint of storage. During transportation of animal carriers while not containing animals, such animal carriers obviously take up a lot of space which must be accommodated for during shipment, handling and storage of the containers. It is desirable, therefore to provide an animal carrier structure which is capable of safely and efficiently containing an animal and which is also capable of being simply and efficiently being reduced to a one piece, relatively flat structure for the purpose of efficient handling and storage when not being used to contain and protect animals.

Collapsible animal carriers have been developed for a substantial period of time as evidenced by U.S. Pat. Nos. 2,079,458 of Leightfuss, 2,530,148 of Bjorklund, et al. and 2,560,089 of Cottingham. Various collapsible animal kennels or containers are also evidenced by U.S. Pat. Nos. 3,048,147 of McKean and 3,611,994 of Bailey et al. For the most part these collapsible animal carriers are of complex construction and though some of them are collapsible to a rather small form for storage, nevertheless, they have disadvantages that render them relatively unacceptable from the standpoint of marketing. In some cases, the collapsible containers, when fully assembled have very little structural integrity. In the case of animal carriers, it is necessary that they be capable of withstanding a significant amount of weight because during shipping, other packages or containers may be stacked thereon. Additionally, during shifting of loads as the result of transportation, other packages may fall on these containers which could cause them to collapse to the detriment of the animal contained therein. It has been almost impossible to provide a collapsible animal carrier that is of simple, light weight construction and yet capable of achieving the degree of structural integrity that is required for shipment and handling of the same. It is desirable, therefore, to provide a collapsible carrying container for animals that is of light weight construction, which folds easily and simply to a rather thin and easily stored condition and which, when assembled, is capable of withstanding considerable weight for protection of the animal inside.

SUMMARY OF THE INVENTION

It is therefore a principle feature of the present invention to provide a novel collapsible carrying container for animals which includes side panels and top and bottom panels that are disposed in hinged assembly and which form a rectangular animal container that is capable of folding out to a flat form for ease of storage and handling when its use as an animal container is not desired.

It is also a feature of this invention to provide a novel collapsible carrying container for animals which includes opposed end walls which are in hinged assembly with the bottom panel, thereby providing the carrying container as an integral unit with all panels thereof hingedly interconnected in unitary manner.

It is an even further feature of this invention to provide a novel collapsible carrying container for animals which incorporates end walls and hinges that are located to materially enhance the structural integrity of the end portions of the collapsible carrying container such that, though being of simple construction and light weight, the carrying container has excellent structural integrity for protection of animals during shipment and handling.

It is also a feature of this invention to provide a novel collapsible carrying container for animals which incorporates a top wall structure having an internal structural member to strengthen the top wall to enhance its load supporting capability and to provide the top wall with efficient structural integrity for attachment of a carrying handle and end support locking members thereto.

Briefly, the various objects and features of the present invention are achieved through the provision of a collapsible carrying container of unitary construction which incorporates opposed side walls, a bottom wall and a top wall for hinged connection of each of the walls with the respective adjacent walls. In each case, these hinges extend the full length of the side, top and bottom walls, thus enhancing the structural integrity of the connection of each wall member to the adjacent wall members. The top wall is provided with an internal structural member extending centrally thereof and terminating just short of the respective ends of the top wall. This internal structural member provides the top wall with enhanced structural integrity for support of a carrying handle and for support of hinges that secure the opposed end walls in place.

The collapsible animal carrier is also provided with a pair of opposed end walls which are hingedly joined to the bottom wall by hinges that extend the full width of the bottom wall. Further, the end walls define out-turned structural flanges on each of the four sides thereof. These structural flanges provide internal structural support for the respective top, bottom and side walls of the collapsible carrying container and thus materially strengthen the opposed ends of the animal container unit. The hinges of the end walls are connected to the bottom out-turned structural flanges of the end walls and thereby cause the end walls to be inserted within the rectangular openings that are defined when the bottom, top and side walls are properly oriented. The ends of the internal structural member of the top wall define stops to insure proper positioning of the respective end walls in the assembled condition of the carrying container.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is an isometric illustration of a collapsible carrying container which is constructed in accordance with the present invention and shown in the assembled position for protecting an animal contained therein.

FIG. 2 is a partial sectional view of the collapsible animal container of FIG. 1 showing the relationship of the pivotal end walls to other structural components and by broken lines, illustrating the opened and storage positions of the end walls.

FIG. 3 is a partial isometric illustration of the collapsible animal carrier of FIG. 1 showing one of the end walls in the open position such as for ingress and egress of an animal.

FIG. 4 is a plan view illustrating the collapsed condition of the animal container such as for storage and handling.

FIG. 5 is an end view of the collapsed animal container of FIG. 4 which illustrates the relationship of the components in the collapsed condition of the unitary animal structure.

DETAILED DESCRIPTION OF PREFERRED EMBODIMENT

Figure 1:
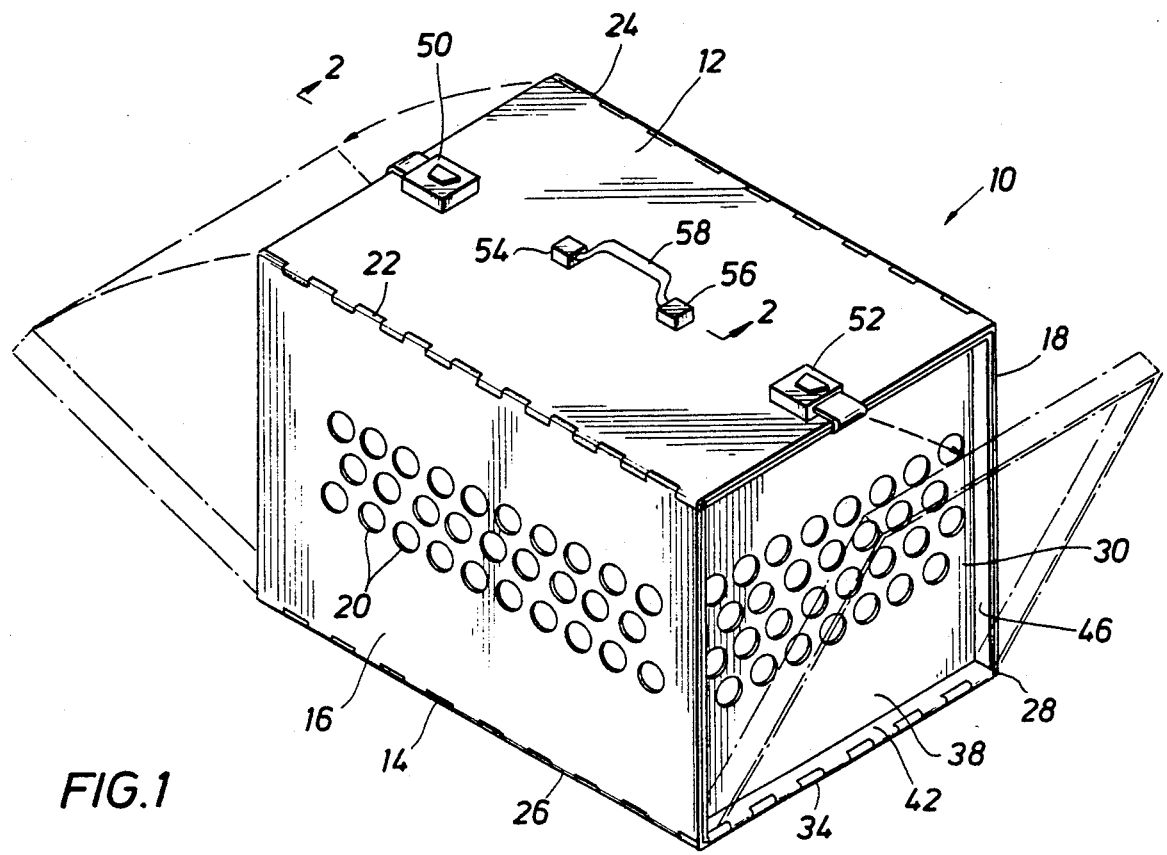
Figure 2:
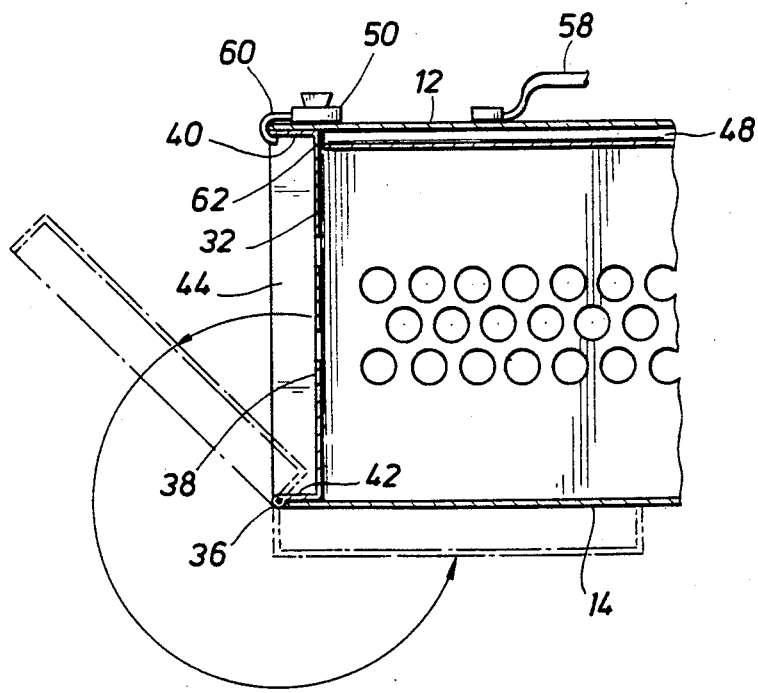

Referring now to the drawings and first to FIGS. 1 and 2, a collapsible carrying container for animals such as cats and dogs is illustrated generally at 10 and incorporates a top wall 12, a bottom wall 14 and a pair of opposed side walls 16 and 18. Each of the top, bottom and side walls is of generally rectangular form and is preferably formed of a suitable sheet metal material such as aluminum or steel but may be formed from any suitable non-metal material as well. The side walls are formed to define a plurality of closely spaced ventilator openings 20 for the purpose of insuring an adequate supply of air to the animal for breathing and for temperature control.

The top wall 12 is hingedly connected to the respective side walls 16 and 18 by hinges 22 and 24 that extend substantially along the entire length of the top and side walls. These long hinges, in addition to providing for pivotal connection between the top wall and side walls, also provide the corners of the collapsible carrying container along its entire length with enhanced structural integrity. Since the top wall 12 is of rectangular form, the hinges 22 and 24 are disposed in parallel relation. Lower hinges 26 and 28 of the same character as hinges 22 and 24, are utilized to secure the bottom wall 14 in pivotal assembly with the respective side walls 16 and 18. The hinges 26 and 28 also provide the lower corners of the animal carrier unit with enhanced structural integrity for effectively resisting externally applied force to thus provide for protection of the animal or animals contained within the animal carrier unit.

A pair of generally rectangular opposed end walls 30 and 32 are connected by hinges 34 and 36 to the bottom wall 14. Each of the end walls may be of the form illustrated in FIGS. 1 and 2 being in the form of a generally rectangular end wall panel 38 having out-turned structural flanges extending from the top, bottom and sides thereof. As shown in FIG. 2, upper and lower out-turned structural flanges 40 and 42 extend outwardly from the end wall panel 38 and, if desired, may be formed integrally with the end wall panel or suitably connected thereto. Typically, the out-turned structural flanges and the end wall panel will be formed from a single sheet of material such as aluminum or another suitable metal which is cut and appropriately formed. Likewise, out-turned side structural flanges 44 and 46 also extend outwardly from the end wall panel 38.

The hinges 34 and 36 at the respective ends of the bottom wall 14 are connected to the bottom out-turned structural flanges 42 of each of the end walls in the manner shown in FIG. 2. This feature permits the end wall panels 38 to be positioned inwardly within the animal carrier unit in spaced relation with respective ends which are defined by the top, bottom and side wall panels. This feature also positions the out-turned structural flanges in parallel, coextensive relation with the respective top, bottom and side wall panels of the animal carrier unit. Therefore, the end wall panel with its out-turned structural flanges provides efficient structural integrity for the respective ends of the animal carrying unit. In fact, though the animal carrier unit may be composed of relatively light-weight sheet material such as aluminum, the structural integrity added by the end wall panels and the out-turned structural flanges will easily allow a two hundred pound person to stand on the ends of the animal carrier unit without causing damage thereto.

Within the animal carrier unit an internal elongate structural member 48, composed of metal or any other suitable material, is attached such as by spot welding, bolting or the like to the inner surface of the top wall 12 to provide enhanced structural integrity for the top wall. The structural member 48 defines opposed parallel side flanges 49 and 51 which engage the inner surface of the top wall and a central portion which is in spaced relation with the inner surface of the top wall. The internal structural member 48 is preferably centered with respect to the top wall and provides for enhanced support for a pair of end wall locking members 50 and 52 and for a pair of handle supports 54 and 56 which provide pivotal support for a carrying support 58. The locking members 50 and 52 each provide movable hook elements 60 which, in the locked position as shown in FIG. 2, securely retain the out-turned flange 40 in locked assembly. The movable hooks 60 are preferably linearly movable by means of an eccentric lock actuator mechanism. It should be born in mind that the locks 50 and 52 may be of any other suitable form without departing from the spirit and scope of the present invention.

The respective ends of the internal structural member 48 define stops 62 which are engaged by the respective end wall panels 38 to restrain the respective end wall panels from further inward movement in their respective closed positions and to properly position the respective out-turned flanges especially the uppermost flange 40 for locking engagement by the hook 60 of the locks 50 and 52.

Figure 3:
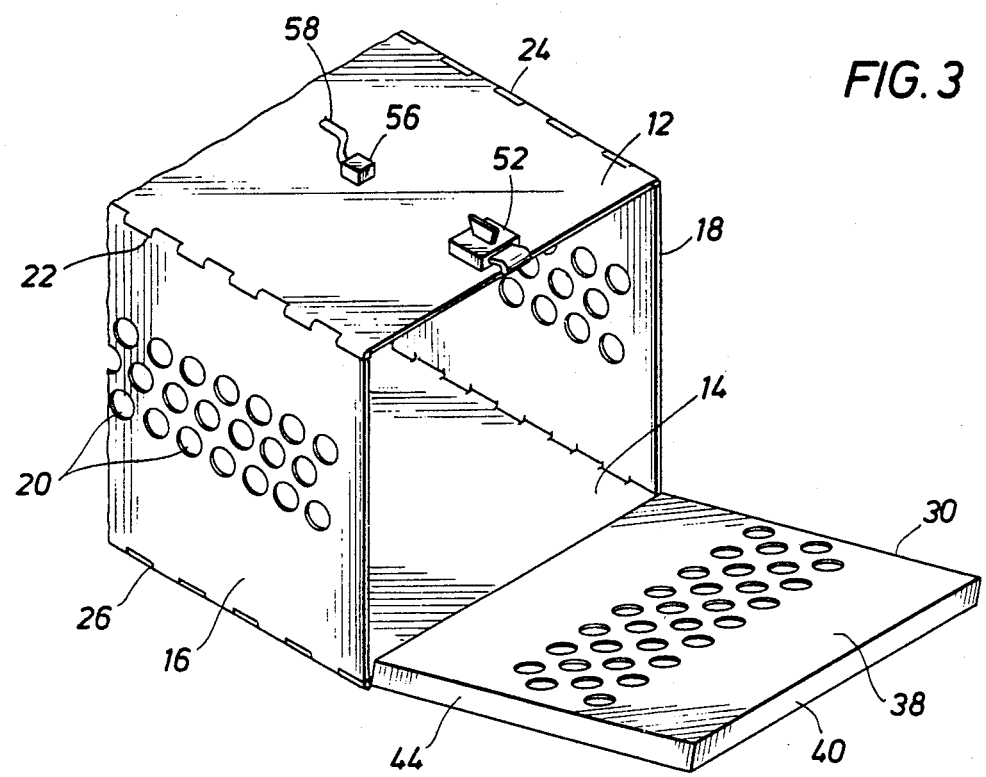

As illustrated in FIG. 3, for ingress and egress of animals with respect to the assembled animal carrying container, one of the end walls 30 is unlocked and is then pivoted downwardly to the position shown in FIG. 3. In this position, the end wall panel 38 forms a ramp or entry panel to allow simple and safe ingress and egress of the animal. Further, since the panel 30 when opened, exposes the entire end of the animal carrier unit, this feature renders the animal carrier unit easy to clean. Further, with a thin sheet of protective material such as paper or plastic may be placed on the bottom wall 14. When the end walls 30 and 32 are pivoted to the closed positions thereof as shown in FIG. 2, the lower out-turned structural member 42 will function to clamp or secure the opposed ends of the protective bottom wall cover that is defined by the layer of material. Animal movement within the container, therefore, will not tend to displace the protective layer of material since it is clamped in place by the lower out-turned flanges of the end walls. This feature insures maintenance of the animal carrying container in a condition for simple and easy cleaning by replacement of the protective layer of material.

Figure 4:
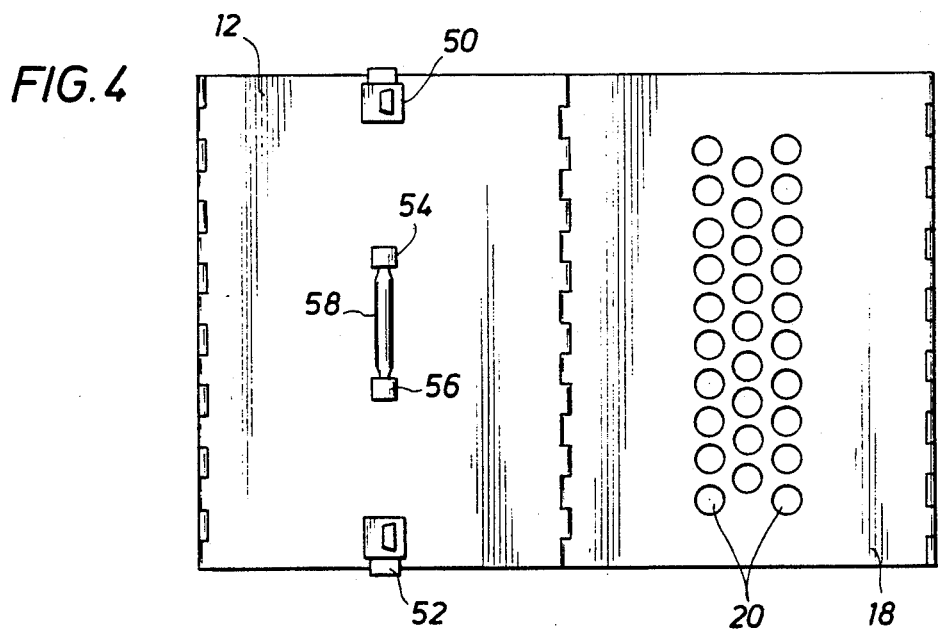
Figure 5:
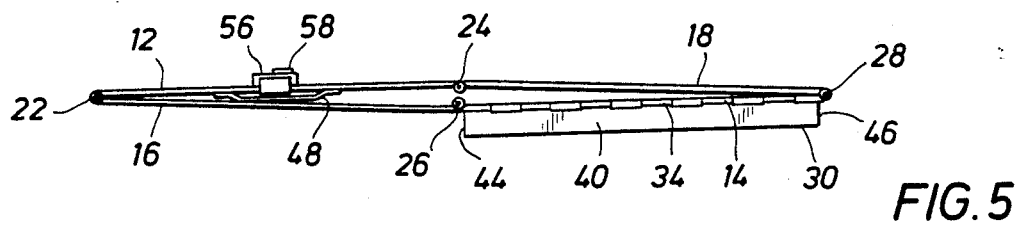

When the animal carrier is not set up for use and its storage or handling is desired, the end walls 30 and 32 are simply unlocked and pivoted outwardly from their respective supporting relations within the end portions of the container. When this has been accomplished, the corner hinges, 22, 24, 26 and 28 will allow the unit to collapse in the nature of a parallelogram to a flat condition as shown in FIGS. 4 and 5. The respective end wall panels may then be pivoted to a substantially parallel relation with the bottom wall 14 in a manner shown in broken lines in FIG. 2 and in full lines in FIG. 5 to thereby reduce the animal carrier unit to a thin configuration and to simplify its storage procedure. It has been found with a fairly large collapsible animal carrier constructed in accordance with the present invention, such as for dogs and cats, that the animal carrier will have a maximum of less than 3 inches of thickness in its fully collapsed condition. The animal carrier may then be stored along the wall of a storage closet, behind furniture, under a bed or in any out of the way place. Further, it may be simply and efficiently transported in its flat, folded storage condition so as to facilitate ease of handling and transportation when an animal is not being contained therein.

In view of the foregoing, it is readily seen that the present invention is one well adapted to attain all of the objects and features hereinabove set forth, together with other features that are inherent in the invention itself. It will be understood that certain combinations and subcombinations are of utility and may be employed without reference to other features and subcombinations. This is contemplated by, and is within the scope of the present invention.

What is claimed is:

1. An integral collapsible carrying container for animals being adapted to fold substantially flat for efficient storage, comprising:
    (a) generally rectangular bottom, top and side walls being formed of sheet material;
    (b) hinge means hingedly connecting said top and bottom walls to said side walls, thereby forming a generally rectangular enclosure capable of collapsing in the manner of a parallelogram to a substantially flat form;
    (c) opposed generally rectangular end wall means being hingedly connected to said bottom wall means and being positionable within the respective ends of said generally rectangular enclosure, said end wall members having out-turned structural flanges at the top, bottom and sides thereof which, when said carrying container is upstanding, are positioned respectively in substantially abutting coextensive relation with the respective inner surfaces of said top, bottom and side walls to provide end walls for said enclosure and to provide enhanced structural integrity for the respective ends of said top, bottom and side walls; and
    (d) means for securing said end walls in locked assembly with respect to said top, bottom and side walls.

2. The collapsible carrying container of claim 1, wherein said hinged connection of said end wall means is disposed at the respective ends of said bottom wall and the outer end of the bottom one of said out-turned structural flanges.

3. The collapsible carrying container of claim 2, wherein said hinged connection of said end wall means extends substantially the entire length of said end wall and provides enhanced structural integrity for the end portions of said bottom wall.

4. The collapsible carrying container of claim 1 wherein said hinged means comprises:
    a pair of hinged means establishing hinged connection of said top wall to said side walls and a second pair of hinge means establishing hinged connection of said bottom wall to said side walls, the respective pivotal axes defined by said first and second pairs of said hinged means being disposed in substantially parallel relation thereby permitting said top, bottom and side walls to be positionable in substantially normal relation with one another when said carrying container is upstanding and to be positionable in substantially parallel relation in the collapsed condition of said carrying container.

5. The collapsible carrying container of claim 4, wherein:
    each hinge of said first and second pairs of hinge means is a single elongate hinge extending substantially the entire length of said top, bottom and side walls to provide for hinged connection thereof and to provide the respective corners of said collapsible carrying container with enhanced structural integrity.

6. The collapsible carrying container of claim 1, including:
    an internal structural member being fixed to the internal wall surface of top wall for enhancing the structural integrity for said top wall, said internal structural member forming stop means at each end thereof for positioning of said side end walls.

7. The collapsible carrying container of claim 6 including:
    a carrying handle assembly being connected to said top wall and having a carrying handle pivotally supported thereby, said carrying handle assembly being secured to said top wall immediately above said internal structural member.

8. The collapsible carrying container of claim 6, wherein said lock means comprises a pair of locks being supported by said top wall adjacent respective ends thereof and each of said locks incorporates a linearly movable hook for receiving ends of said top wall and said out-turned upper structural flange for securing the same in said substantially abutting coextensive relation.

* * * * *